(12) United States Patent
Sayles

(10) Patent No.: US 6,549,963 B1
(45) Date of Patent: Apr. 15, 2003

(54) METHOD OF CONFIGURING DEVICES ON A COMMUNICATIONS CHANNEL

(75) Inventor: Paul J. Sayles, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/248,598

(22) Filed: Feb. 11, 1999

(51) Int. Cl.$^7$ .............................................. G06F 13/00
(52) U.S. Cl. ........................ 710/104; 713/1; 713/100
(58) Field of Search ........................... 710/104, 8, 10; 713/1, 2, 100; 345/520, 521

(56) References Cited

U.S. PATENT DOCUMENTS

| | | | | |
|---|---|---|---|---|
| 5,410,699 A | * | 4/1995 | Bealkowski et al. ............ 713/2 |
| 5,579,522 A | * | 11/1996 | Christeson et al. ............ 713/2 |
| 5,889,970 A | * | 3/1999 | Horan et al. ................. 710/126 |
| 5,892,964 A | * | 4/1999 | Horan et al. .................. 712/33 |
| 5,938,764 A | * | 8/1999 | Klein ............................. 713/1 |
| 5,960,445 A | * | 9/1999 | Tamori et al. ............... 707/203 |
| 6,047,373 A | * | 4/2000 | Hall et al. ...................... 713/1 |
| 6,122,733 A | * | 9/2000 | Christeson et al. ............ 713/2 |
| 6,275,240 B1 | * | 8/2001 | Riffault ....................... 345/520 |
| 6,141,021 A1 | * | 10/2001 | Bickford et al. ............ 345/503 |

OTHER PUBLICATIONS

"PVI–486AP4 User's Manual", Rev 1.0 Aug. 1994, pp. 3–1 to 3–35.*
Intel Corporation *Preliminary Draft of Accelerated Graphics Port Interface Specification*, Rev. 2.0, pp. 1–33, 38–48, 70–81, 153–175, 187–193, 227–235 (Dec. 1997).
Intel Corporation, *A.G.P. Three Load Bus Issues And Analysis*, Rev. 0.4, pp. 1–27 (Jan. 1998).

* cited by examiner

Primary Examiner—Xuan M. Thai
Assistant Examiner—X. Chung-Trans
(74) Attorney, Agent, or Firm—Trop, Pruner & Hu, P.C.

(57) ABSTRACT

A system includes a bus and devices capable of supporting multiple data transfer rates coupled to the bus. Each device includes a storage element storing a value indicating the supported transfer rates. A routine is adapted to update the value in the storage element of at least one device to indicate that one or more data transfer rates are unsupported by the device. The bus may include an Accelerated Graphics Port (AGP) bus.

16 Claims, 3 Drawing Sheets

METHOD OF CONFIGURING DEVICES ON A COMMUNICATIONS CHANNEL

This application is related to copending and commonly assigned patent application Ser. No. 09/248,559 entitled "Apparatus for Configuring Devices on a Communications Channel," filed concurrently herewith.

BACKGROUND

The invention relates to configuring devices that are coupled to a communications channel such as a bus.

A typical computer includes one or more buses over which devices can communicate with each other. A primary bus such as the Peripheral Component Interconnect (PCI) bus may interconnect several integrated devices, such as processor/memory subsystems, bridge controllers, peripheral controllers, and peripheral add-in boards.

Another bus in the system may be a point-to-point bus in which active communication may occur only between two devices residing on the bus. One such bus is the Accelerated Graphics Port (AGP) bus, as defined by the Accelerated Graphics Port Interface Specification, Revision 2.0, published in May 1998. The AGP bus provides a relatively high-speed communications path between a graphics device and main memory, which may be utilized to store some video data (including 3D graphics data).

In the AGP architecture, an AGP bus is defined that is coupled to a target and a master. The target typically includes an AGP interface in a host bridge, and the master typically includes a graphics accelerator. The AGP bus defines a point-to-point interface in which active communication occurs only between two AGP agents. In some implementations, more than two devices may be attached to the bus, in which two AGP masters and an AGP target reside on the AGP bus. In this configuration, one of the two masters is disabled so that only one active master and one active target are present on the bus. Because of signal quality issues when more than two AGP devices are coupled to the AGP bus, however, a need exists to ensure proper operation of the AGP bus when more than two devices are coupled to the bus.

SUMMARY

In general, in one embodiment, a method of configuring devices coupled to a communications channel in a system includes accessing storage elements in the devices that contain values representative of communications characteristics of the devices. The values in the storage elements are updated to indicate that certain communications characteristics are unavailable.

In general, in another embodiment, a system includes a communications channel and devices coupled to the communications channel. Each device contains an indication of a communications characteristic of the device. A control entity configures each device by changing the indication to indicate a different communications characteristic.

Other embodiments and features will become apparent from the following description and from the claims.

DETAILED DESCRIPTION

Figure 1:
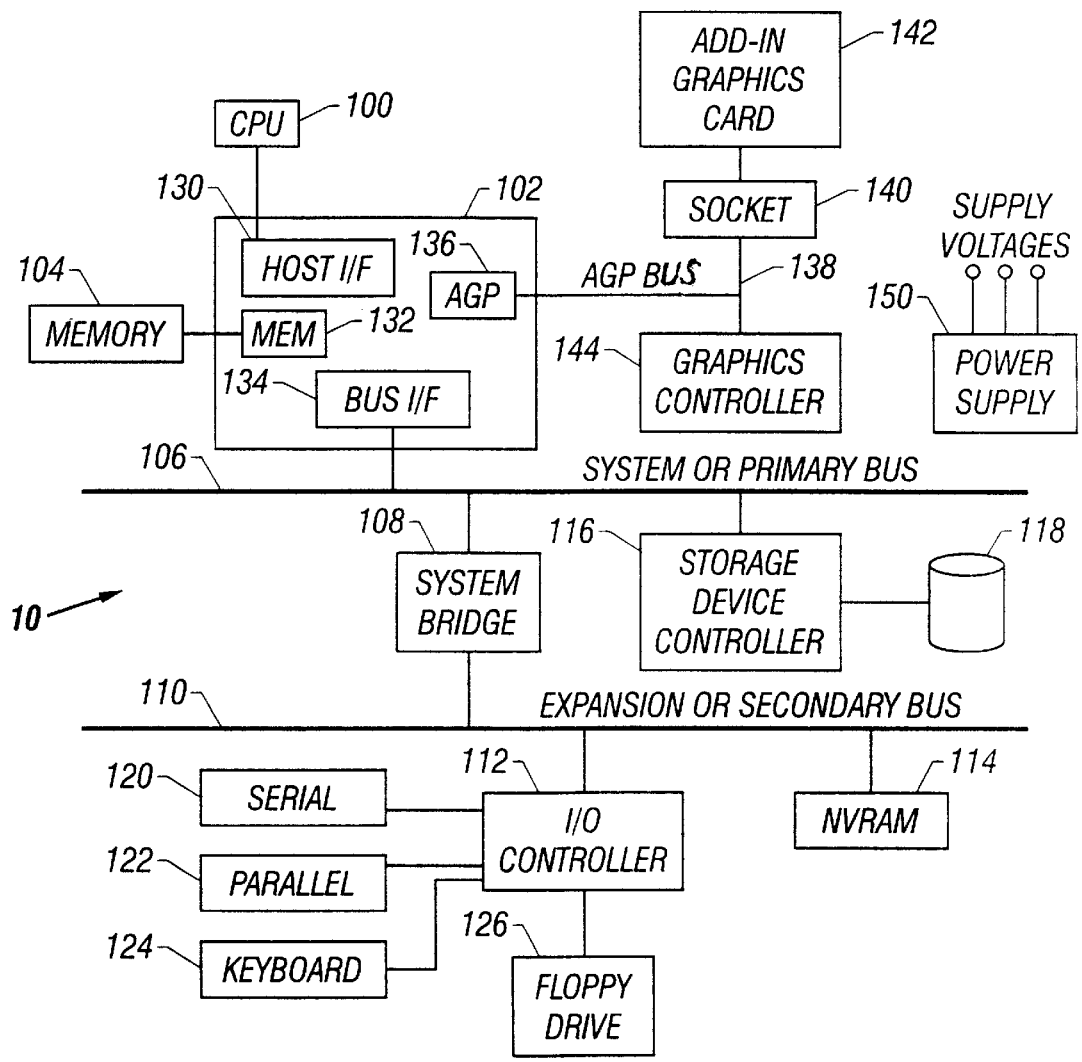
FIG. 1 is a block diagram of an embodiment of a system.

In the following description, numerous details are set forth to provide an understanding of the present invention. However, it is to be understood by those skilled in the art that the present invention may be practiced without these details and that numerous variations or modifications from the described embodiments may be possible.

In a system according to some embodiments, a communications channel such as a bus may be coupled to multiple devices having different communications characteristics, including, for example, data transfer rates. In one embodiment, one such bus includes an Accelerated Graphics Port (AGP) bus, defined in the Accelerated Graphics Port Interface Specification, Revision 2.0, published in May 1998. AGP devices may operate according to one of several transfer modes in which data are transferred at different rates.

In this description, although reference is made to the AGP bus and AGP devices in some embodiments, it is to be understood that the invention is not to be limited in this respect. Other embodiments may include other types of communications channels and devices.

During system initialization, the system may adjust settings in devices coupled to a bus to indicate communications characteristics that are supported by the devices. For example, in one embodiment, configuration settings in the devices may be changed to indicate that the devices are capable of supporting only a limited subset of available data transfer rates. Thus, for example, with an AGP bus that is coupled to more than two devices, the configuration information of the devices may be changed to prevent the devices from operating at more than a predetermined transfer rate. In further embodiments, settings of devices indicating supported communications characteristics may be changed for system test purposes.

Based on the updated device settings, a routine (such as an operating system routine) may set operating characteristics of the devices so that they operate according to supported communications characteristics. For example, in a current AGP bus implementation, three transfer modes are available, including a 1X transfer mode, a 2X transfer mode, and a 4X transfer mode. In the 1X transfer mode, eight bytes of data may be transferred in two clock (AGPCLK) periods. In the 2X transfer mode, eight bytes of data may be transferred in one AGPCLK period. In the 4X transfer mode, sixteen bytes of data may be transferred in one AGPCLK period. If the settings in the devices coupled to an AGP bus indicate that the 4X transfer mode is not supported, then the routine may set the devices to either the 1X mode or the 2X mode during operation.

In further embodiments, communications characteristics of devices on a bus may include other features, including, for example, the address space accessible by the devices; the number of commands a device can queue for pipelined operations; whether special high-rate read or write transfers are supported; and so forth. Device settings may indicate whether the bus devices support such other communications characteristics. These settings may similarly be updated, with operating characteristics of the bus devices set according to the updated settings.

An advantage offered by embodiments of the invention is that communications characteristics of communications channels, such as buses, may be managed to maintain signal integrity. For example, in a point-to-point bus, such as an AGP bus, on which more than two devices reside, an initialization routine may change configuration settings in the devices to indicate that certain transfer modes are not supported. The presence of one or more devices on the bus may create extra loading and trace stubs that affect the termination and reflection characteristics of signals transferred over the bus. To reduce effects of the extra loading and trace stubs, high transfer rates (such as the 4X transfer mode) may be avoided. Another advantage includes the ability in system test operations to change features supported by devices coupled to a bus.

In one embodiment, when the system initially starts up, an initialization or startup routine, such as a basic input/output system (BIOS) routine, changes settings in devices coupled to an AGP bus to indicate which transfer modes are supported and which are not. During operation, a predefined routine, such as an operating system (OS) routine, accesses the settings in devices coupled to the bus to determine a transfer mode that may be supported by all devices coupled to the bus. Based on the settings, the OS routine may set operating characteristics of these devices so that they operate according to a commonly supported transfer mode. In alternative embodiments, the initialization or startup routine rather than the OS routine may set the operating characteristics of the bus devices.

Referring to FIG. 1, according to one embodiment, a system 10 includes a central processing unit (CPU) 100 that is coupled to a host bridge 102. The CPU 100 may be a general-purpose or special-purpose processor such as a microprocessor, a microcontroller, an application-specific integrated circuit (ASIC), a programmable gate array (PGA), or other control devices. The system 10 may include, by way of example, a computer, a microprocessor- or microcontroller-based system, a hand-held computing device, a set-top box, an appliance, a game system, or any other controller-based system in which the controller may be a programmable device such as ASIC, a PGA, or the like.

The host bridge 102 includes ports to various devices, including a memory 104, a system or primary bus 106, and an AGP bus 138. The system or primary bus 106 may include a Peripheral Component Interconnect (PCI) bus as defined in the PCI Local Bus Specification, Production Version, Revision 2.1, published in June 1995. The host bridge 102 includes a host interface 130 coupled to the CPU 100, a memory controller 132 coupled to the memory 104, an AGP interface 136 coupled to the AGP bus 138, and a bus interface 134 coupled to the system bus 106.

The AGP bus 138 may be coupled to a graphics controller 144 such as a graphics accelerator. Optionally, according to one embodiment, the AGP bus 138 may also be coupled to another graphics controller. In this embodiment, an add-in graphics card 142 may be coupled to the bus 138 through a socket 140. Such a configuration including devices 102, 142, and 144 on the bus 138 may be referred to as a three-load configuration or an up-down configuration. In this embodiment, the graphics controller 144 may be referred to as a down device and the add-in graphics card 142 may be referred to as an up device.

In alternative embodiments, an up-only or a down-only configuration may be implemented. In an up-only configuration, one graphics controller (142 or 144) is coupled to the bus 138 through a socket. In a down-only configuration, one graphics controller (142 or 144) may be directly mounted on the circuit board on which the bus 138 is located.

The system bus 106 may be coupled to various devices, including a storage device controller 116 that may be coupled to various mass storage devices 118, including a hard disk drive, a compact disc (CD) or digital video disc (DVD) drive, or other types of mass storage devices. Optionally, the system bus 106 may also be coupled to a network interface card (not shown) for coupling to a network.

The system 10 may also include an expansion or secondary bus 110. The expansion or secondary bus 110 may include an Industry Standard Architecture (ISA) bus, an Extended Industry Standard Architecture (EISA) bus, a Microchannel Architecture (MCA) bus, or other buses. A system bridge 108 is located between the system bus 106 and the expansion bus 110. Coupled to the expansion bus 110 may be an input/output (I/O) controller 112 having interfaces coupled to various devices, including for example, a serial port 120, a parallel port 122, a keyboard 124, and a floppy drive 126. A nonvolatile memory 114 may also be coupled on the expansion bus 110. The nonvolatile memory may include erasable and programmable read-only memories (EPROMs), electrically erasable and programmable read-only memories (EEPROMs), flash memories, battery-backed random access memories (RAMs), and the like. The nonvolatile memory 114 may be used to store startup routines, such as BIOS routines, for booting and initializing the system 10.

The system 10 may be powered by a power supply 150 that provides several supply voltages. The power supply 150 may be coupled to an external power source such as an alternating current (AC) source. In some systems, such as portable systems including notebook or mobile computers, the power supply 150 may be coupled to an internal power source such as a battery.

Figure 2:
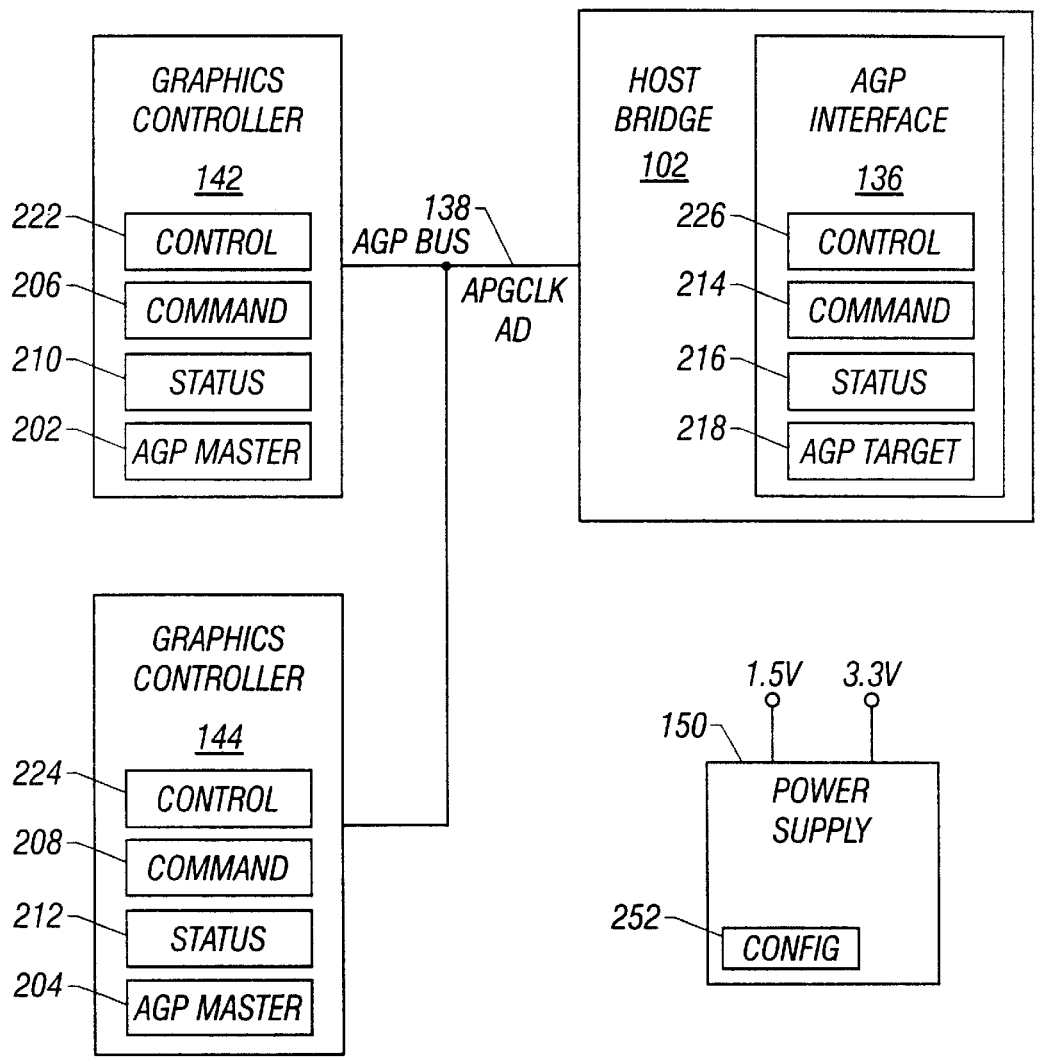
FIG. 2 is a block diagram of devices according to one embodiment coupled to an Accelerated Graphics Port (AGP) bus in the system of FIG. 1.

Referring to FIG. 2, components of the graphics controllers 142 and 144 as well as the AGP interface 136 are illustrated. In other embodiments, the bus 138 may be coupled to only two devices, the host bridge AGP interface 136 and either graphics controller 142 or 144. In the three-load configuration illustrated in FIG. 2, one of the graphics controllers 142 and 144 is disabled so that only one master and one target are active on the AGP bus 138. Disabling one of the graphics controllers may be performed a number of different ways. When disabled, a graphics controller is prevented from driving bus signals. In one example, the signals of a controller may be tri-stated upon exit from reset with the signals kept at that state until the controller is activated, which may be performed by the BIOS, for example. In another example, if signals are driven by a controller after system reset, the controller may be maintained in reset such as by driving an input pin of the controller to a predetermined state.

In one embodiment, presence of an add-in graphics card 142 in the socket 140 may be detected. If the card 142 is present, then an indication (such as a signal driven to a particular state) may be provided. This indication may be provided in the form of an input signal to the graphics controller 144 to disable that controller. Alternatively, the indication may be a flag accessible by the BIOS to determine if the add-in card 142 is present so that the BIOS can deactivate one of the controllers 142 and 144. To disable the add-in card 142, a signal to the card may be driven to a predetermined state. Other embodiments are also possible.

Each of the graphics controllers 142 and 144 includes an AGP master 202 and 204, respectively. The graphics controllers 142 and 144 also include various configuration registers, including command registers 206 and 208 and status registers 210 and 212, respectively.

In the host bridge 102, the AGP interface 136 also includes a command register 214 and a status register 216. The AGP interface 136 further includes AGP target logic 218 to receive transactions initiated by the active one of the AGP masters 202 and 204 over the AGP bus 138. Signals on the AGP bus 138 include the clock AGPCLK, address/data signals AD (which may be 32 bits wide), and control signals.

In one embodiment, the status registers 210, 212, and 216 of the devices 142, 144 and 136, respectively, may indicate the transfer rate or rates supported by each of those devices. As mentioned, currently available transfer rates are 1X, 2X, and 4X. In one embodiment, bits in the status registers 216 and the status register 210 or 212 (of the active one of graphics controllers 142 and 144) may be changed by a BIOS routine during system startup to indicate the transfer rates supported. Based on the contents of the status registers, an OS routine may then set the data transfer rate to be utilized by the AGP target 218 in the host bridge AGP interface 136 and by the AGP master 202 or 204 in the active one of the graphics controllers 142 and 144, respectively.

An OS routine may set the transfer rate of communications over the AGP bus 138 by programming predetermined bits in the command register 214 of the AGP interface 136 and in the command register 206 or 208 in the active one of the graphics controller 142 and 144. Thus, for example, if the AGP interface 136 supports a 2X transfer rate but the active one of the graphics controllers, e.g., 142, supports only a 1X transfer rate, then the command registers 206 and 214 would be programmed to indicate that communications over the AGP bus is to proceed according to the 1X transfer rate.

The status registers 210, 212, and 216 may also indicate other supported features, such as the number of pipelined operations capable of being issued and received by bus devices, whether bus devices are capable of accessing address space above a certain address value, and whether devices are capable of performing fast write transfers. The OS routine may set command register bits in the bus devices to enable such features if the devices support them.

The status registers 210, 212 and 216 are normally read-only registers. To update contents of the status registers to change communications characteristics that may be supported by the devices 142, 144, and 136, the BIOS first changes each of the status registers 210, 212 and 216 to a read-write register. This may be accomplished by setting a flag, such as one or more bits in control registers 222, 224, and 226 in the devices 142, 144, and 136, respectively. In one embodiment, bits of the control registers 222, 224, and 226 may be accessible by the BIOS routine and not by an OS routine. This may ensure that application programs do not have access to change contents of the status registers 210, 212, and 216 during system operation.

Figure 3:
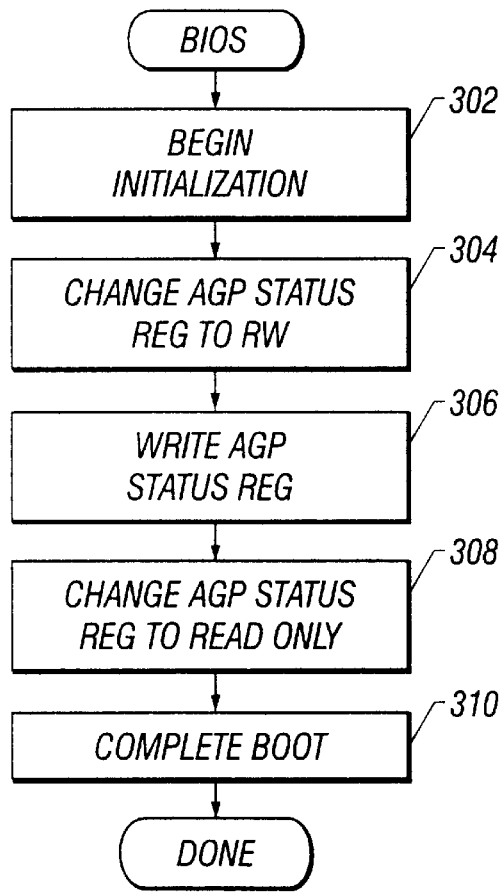
FIG. 3 is a flow diagram of a startup routine to configure the system of FIG. 1.

Referring to FIG. 3, according to one embodiment, the BIOS routine first performs (at 302) certain initialization tasks, including programming configuration registers of different devices in the system 10. Next, the system 10 changes (at 304) the attribute of the AGP status register 216 and the status register 210 or 212 to read-write. This may be accomplished by programming one or more bits in the control register 226 and the control register 222 or 224 of the active one of the graphics controllers 142 and 144.

The BIOS routine may be programmed to change communications settings in the AGP devices for various reasons. The BIOS may be programmed to change the communications settings if more than two devices are coupled to the AGP bus 138. Because of signal integrity concerns, the devices may be configured by the BIOS routine to not support the 4X transfer rate. Another reason for changing communications settings may be that the power supply 150 may not be suitable for certain applications. For example, under the AGP specification, signaling voltage levels may be different for the different transfer modes. The signaling level for the 1X transfer mode is 3.3 or 1.5 volts. The signaling level for the 2X transfer mode is 3.3 or 1.5 volts. The signaling level for the 4X transfer mode is 1.5 volts. If a power supply 150 is used that does not generate a 1.5-volt supply voltage, then the settings of the AGP devices may be changed to indicate that the 4X transfer mode is not supported.

Another reason to change communications settings is during system testing. It may be desirable to change the communications settings of the AGP devices to test their performance at different data transfer rates. In one embodiment, a table may be loaded with the BIOS routine that contains values that the BIOS routine is to use to update configuration settings including the status registers 210, 212, and 216.

In another embodiment, the BIOS routine may be programmed to detect if certain conditions exist before the AGP device communications settings are updated. The BIOS routine may be programmed to determine if more than two devices are located on the AGP bus 138. This may be performed by, for example, accessing predetermined address locations on the AGP bus 138 to determine if corresponding responses are received. Also, the BIOS routine may access a configuration register 252 in the power supply 150 to determine if the power supply is capable of providing a 1.5-volt supply voltage for 4X transfer mode operation (see FIG. 2).

Next, the BIOS may change (at 306) bits in the status registers to indicate that one or more transfer modes may not be supported, e.g., the 4X transfer mode. In further embodiments, the BIOS may change other bits in the status registers 216 and the status register 210 or 212 to indicate if other communications characteristics are supported. After the AGP status register has been updated, the attribute of the status registers are again changed (at 308) to read-only. The BIOS then completes (at 310) the boot process, which includes booting the OS.

Figure 4:
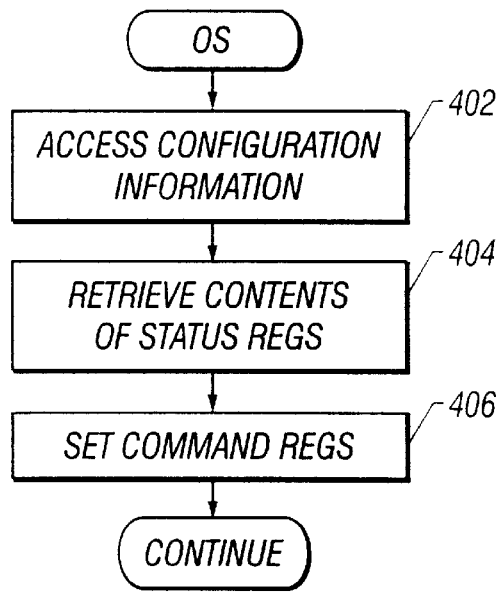
FIG. 4 is a flow diagram of an operating system routine in the system of FIG. 1.

Referring to FIG. 4, once the OS is booted, an OS routine accesses (at 402) configuration information set up by the BIOS routine to configure the OS. Next, the OS routine reads (at 404) the contents of the status register 216 in the host bridge AGP interface 136 and the status register 210 or 212 in the active one of graphics controllers 142 and 144 to determine communications characteristics supported by the bus devices. Based on the retrieved values, the OS routine programs (at 406) set appropriate bits in the command register 214 in the host bridge AGP interface 136 and the command register 206 and 208 in the active one of the graphics controllers 142 and 144 to set operating characteristics of the devices. For example, the command registers may be set to indicate which transfer mode is to be utilized for data transfers. The OS routine may also set other operating characteristics in the devices.

Various software or firmware (formed of modules, routines, or other layers, for example), including applications, operating system modules or routines, device drivers, BIOS modules or routines, and interrupt handlers, may be stored or otherwise tangibly embodied in one or more storage media in the system 10. Storage media suitable for tangibly embodying software and firmware instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the storage media when executed cause the system 10 to perform programmed acts.

The software or firmware can be loaded into the system 10 in one of many different ways. For example, instructions or other code segments stored on storage media or transported through a network interface card, modem, or other interface mechanism may be loaded into the system 10 and executed to perform programmed acts. In the loading or transport process, data signals that are embodied as carrier waves (transmitted over telephone lines, network lines, wireless links, cables and the like) may communicate the instructions or code segments to the system 10.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of configuring devices coupled to a communications channel in a system, comprising:

accessing storage elements in the devices containing values representative of communications characteristics of the devices;

updating the values in the storage element of at least one device; and accessing the updated values of the storage elements and setting an operating characteristic of each device on the communications channel based on the updated values, wherein setting the operating characteristic comprises setting an operating characteristic selected from the group consisting of a number of pipelined operations the device is able to support; and an address space accessible by the device.

2. The method of claim 1, wherein updating comprises indicating that one or more communications characteristics are unavailable.

3. The method of claim 1, wherein setting the operating characteristic includes setting a command register to a predetermined value to indicate a communications characteristic to utilize.

4. The method of claim 1, further comprising changing an attribute of the storage element in at least one device from read-only to read-write to update the value in the storage element.

5. The method of claim 4, further comprising changing the attribute of the storage element in at least one device from read-write to read-only after the value has been updated.

6. The method of claim 1, wherein updating the values comprises indicating an address space that is not accessible.

7. The method of claim 1, wherein setting the operating characteristic comprises selecting a common communications characteristic of each device.

8. A method of testing devices coupled to a bus, comprising:

accessing storage elements in the devices during a test operation;

changing a value in the storage element in at least one device to indicate one or more communications characteristics supported by the device; and testing, after changing the value in the storage element in the at least one device, the devices utilizing the one or more supported communications characteristics.

9. A method of configuring devices, the method comprising:

determining whether a power supply generates a voltage of a predetermined level;

accessing status registers in the devices containing values representative of communications characteristics of the devices on a bus; and in response to determining that the power supply does not generate the voltage of the predetermined level, updating the status register of at least one device to indicate that less than all communications characteristics are available.

10. A method, comprising:

determining whether more than two devices are on a bus in a system;

in response to determining more than two devices are on the bus, updating a setting in a first device coupled to the bus;

in response to determining more than two devices are on the bus, updating a setting in a second device coupled to the bus;

selecting an operating setting that is common to at least the setting in the first device and the setting in the second device, and disabling a third device coupled to the bus but maintaining active the first and second devices coupled to the bus.

11. The method of claims 10, wherein updating the setting in the first device comprises updating the setting in the first device representing communications on an Accelerated Graphics Port bus.

12. The method of claim 10, wherein updating the setting in the first device comprises indicating a transfer rate that is not available.

13. The method of claim 10, wherein updating the setting in the first device comprises updating while initializing the system.

14. The method of claim 13, wherein updating the setting in the first device comprises updating the setting by a basic input/output system routine executing on the system.

15. The method of claim 14, wherein selecting the operating setting comprises selecting during an operation state of the system.

16. The method of claim 15, wherein selecting the operating setting comprises selecting the operating setting using an operating system routine.

* * * * *